US012623494B2

(12) United States Patent
Mizushima

(10) Patent No.: US 12,623,494 B2
(45) Date of Patent: May 12, 2026

(54) PNEUMATIC TIRE

(71) Applicant: The Yokohama Rubber Co., LTD.,
Tokyo (JP)

(72) Inventor: Haruna Mizushima, Hiratsuka (JP)

(73) Assignee: The Yokohama Rubber Co., Ltd.,
Tokyo (JP)

( * ) Notice: Subject to any disclaimer, the term of this
patent is extended or adjusted under 35
U.S.C. 154(b) by 1026 days.

(21) Appl. No.: 16/966,418

(22) PCT Filed: Dec. 25, 2018

(86) PCT No.: PCT/JP2018/047683
§ 371 (c)(1),
(2) Date: Jul. 30, 2020

(87) PCT Pub. No.: WO2019/150855
PCT Pub. Date: Aug. 8, 2019

(65) Prior Publication Data
US 2021/0039446 A1 Feb. 11, 2021

(30) Foreign Application Priority Data

Jan. 30, 2018 (JP) ................................ 2018-014169

(51) Int. Cl.
*B60C 11/12* (2006.01)
*B60C 11/03* (2006.01)
*B60C 11/13* (2006.01)

(52) U.S. Cl.
CPC .............. *B60C 11/12* (2013.01); *B60C 11/13*
(2013.01); *B60C 2011/0346* (2013.01);
(Continued)

(58) Field of Classification Search
CPC ..... B60C 2011/0341; B60C 2011/0348; B60C
2011/0381
See application file for complete search history.

(56) References Cited

U.S. PATENT DOCUMENTS 5,560,791 A 10/1996 Kajita
7,673,663 B2 * 3/2010 Murata ................... B60C 11/13
152/209.15

(Continued)

FOREIGN PATENT DOCUMENTS

CN 101687440 3/2010
CN 102398483 4/2012
(Continued)

OTHER PUBLICATIONS

JP 5250063 machine translation (Year: 2013).*
International Search Report for International Application No. PCT/
JP2018/047683 dated Apr. 9, 2019, 4 pages, Japan.

*Primary Examiner* — Katelyn W Smith
*Assistant Examiner* — Wendy L Boss
(74) *Attorney, Agent, or Firm* — Thorpe North & Western

(57) ABSTRACT

A pneumatic tire includes circumferential main and narrow
grooves, shoulder and second land portions, and closed lug
grooves. The circumferential main groove is in a region
outer side in a width direction demarcated by an equatorial
plane. The circumferential narrow groove is outward of the
circumferential main groove in a width direction. The shoul-
der and second land portions are defined by the circumfer-
ential main and narrow grooves. The closed lug grooves
extend in the width direction and penetrate the circumfer-
ential narrow groove. The closed lug grooves have inner
terminating end portions in the width direction inside the
second land portion and have outer terminating end portions
inside the shoulder land portion. An extension length
L1_min in the width direction of the shortest first closed lug
grooves and an extension length L1_max in the width
direction of the longest second closed lug grooves have a
relationship 1.10≤L1_max/L1_min≤3.00.

23 Claims, 12 Drawing Sheets

(52) U.S. Cl.
CPC ................. *B60C 2011/0348* (2013.01); *B60C 2011/0365* (2013.01); *B60C 2011/0372* (2013.01); *B60C 2011/0388* (2013.01)

(56) References Cited

U.S. PATENT DOCUMENTS

| | | | |
|---|---|---|---|
| 10,668,774 B2 | 6/2020 | Kouda | |
| 2003/0111149 A1 | 6/2003 | Caretta et al. | |
| 2010/0108214 A1* | 5/2010 | Colombo | ............ B60C 11/1369 |
| | | | 152/209.9 |
| 2012/0060987 A1 | 3/2012 | Nemoto | |
| 2012/0085471 A1 | 4/2012 | Horiguchi | |
| 2012/0325386 A1* | 12/2012 | Dautrey | ............. B60C 11/0309 |
| | | | 152/209.18 |
| 2013/0133797 A1 | 5/2013 | Takagi | |
| 2014/0238568 A1 | 8/2014 | Haga | |
| 2017/0157985 A1 | 6/2017 | Aoki | |
| 2017/0225515 A1 | 8/2017 | Hayashi | |
| 2017/0305198 A1 | 10/2017 | Ichimura | |

FOREIGN PATENT DOCUMENTS

| | | | | |
|---|---|---|---|---|
| CN | 103129323 | 6/2013 | | |
| CN | 104159754 | 11/2014 | | |
| CN | 106536231 | 3/2017 | | |
| CN | 106604832 | 4/2017 | | |
| CN | 106864177 | 6/2017 | | |
| CN | 107074034 | 8/2017 | | |
| JP | H07-117417 | 5/1995 | | |
| JP | 2007-237805 | 9/2007 | | |
| JP | 2012-056479 | 3/2012 | | |
| JP | 2012-081806 | 4/2012 | | |
| JP | 5250063 B2 * | 7/2013 | ............ | B60C 11/03 |
| JP | 2016-074386 | 5/2016 | | |
| WO | WO 01/39572 | 6/2001 | | |
| WO | WO 2009/004408 | 1/2009 | | |
| WO | WO 2013/051053 | 4/2013 | | |
| WO | WO 2013/133049 | 9/2013 | | |
| WO | WO 2016/017149 | 2/2016 | | |
| WO | WO 2016/056505 | 4/2016 | | |

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|---|
| CIRCUMFERENTIAL NARROW GROOVE | YES | YES | YES | YES | YES | YES | YES | YES | YES | YES | YES | YES | YES |
| FIRST CLOSED LUG GROOVE (41A) | YES | YES | YES | YES | YES | YES | YES | YES | YES | YES | YES | YES | YES |
| SECOND CLOSED LUG GROOVE (41B) | NO | YES | YES | YES | YES | YES | YES | YES | YES | YES | YES | YES | YES |
| SHOULDER LUG GROOVE | YES | YES | YES | YES | YES | YES | YES | YES | YES | YES | YES | YES | YES |
| $L1\_max/L1\_min$ | 1.00 | 1.00 | 1.50 | 1.10 | 2.90 | 1.50 | 1.50 | 1.50 | 1.50 | 1.50 | 1.50 | 1.50 | 1.50 |
| $Di\_max/Di\_min$ | 1.00 | 1.00 | 2.50 | 2.50 | 2.50 | 1.20 | 2.90 | 2.50 | 2.50 | 2.50 | 2.50 | 2.50 | 2.50 |
| $Di\_min/W1$ | 0 | 0 | 0.30 | 0.30 | 0.30 | 0.30 | 0.30 | 0.20 | 0.50 | 0.30 | 0.30 | 0.30 | 0.30 |
| $Do\_max/Do\_min$ | 1.00 | 1.00 | 1.00 | 1.00 | 1.00 | 1.00 | 1.00 | 1.00 | 1.00 | 0.95 | 1.05 | 1.00 | 1.00 |
| $Do\_min/W2$ | 0.20 | 0.20 | 0.20 | 0.20 | 0.20 | 0.20 | 0.20 | 0.20 | 0.20 | 0.20 | 0.20 | 0.15 | 0.30 |
| WET STEERING STABILITY PERFORMANCE | 100 | 105 | 110 | 107 | 115 | 107 | 115 | 107 | 112 | 109 | 111 | 108 | 112 |
| DRY STEERING STABILITY PERFORMANCE | 100 | 95 | 105 | 102 | 102 | 102 | 102 | 106 | 103 | 106 | 104 | 106 | 104 |
| NOISE PERFORMANCE | 100 | 103 | 105 | 105 | 105 | 105 | 105 | 105 | 105 | 105 | 105 | 105 | 105 |

FIG. 10

CONVENTIONAL EXAMPLE

COMPARATIVE EXAMPLE

PNEUMATIC TIRE

TECHNICAL FIELD

The technology relates to a pneumatic tire and particularly relates to a pneumatic tire that can provide dry performance and wet performance of the tire in a compatible manner.

BACKGROUND ART

Recently, it has been requested for pneumatic tires to improve sports performance not only in circuit traveling but also in traveling in an urban area and a highway. Therefore, to provide dry performance and wet performance of the tire in a compatible manner, a configuration that includes two circumferential main grooves in a region inner side in a vehicle width direction demarcated by a tire equatorial plane, and a single circumferential main groove and a single circumferential narrow groove in a region outer side in the vehicle width direction has been employed. An example of a conventional pneumatic tire that is configured in this manner is the technology described in Japan Unexamined Patent Publication No. 2016-074386.

SUMMARY

The technology provides a pneumatic tire that can provide dry performance and wet performance of the tire in a compatible manner.

A pneumatic tire according to an embodiment of the technology includes a circumferential main groove, a circumferential narrow groove, a shoulder land portion and a second land portion, and a plurality of closed lug grooves. The circumferential main groove is disposed in one region demarcated by a tire equatorial plane. The circumferential narrow groove is disposed outward of the circumferential main groove in a tire width direction. The shoulder land portion and the second land portion are defined by the circumferential main groove and the circumferential narrow groove. The plurality of closed lug grooves extend in the tire width direction and penetrate the circumferential narrow groove. The plurality of closed lug grooves have inner terminating end portions in the tire width direction inside the second land portion. The plurality of closed lug grooves have outer terminating end portions inside the shoulder land portion. An extension length L1_min in the tire width direction of the shortest first closed lug grooves and an extension length L1_max in the tire width direction of the longest second closed lug grooves have a relationship $1.10 \leq L1\_max/L1\_min \leq 3.00$.

In the pneumatic tire according to the embodiment of the technology, (1) the closed lug grooves penetrating the circumferential narrow groove improve drainage properties in a vicinity of the circumferential narrow groove to improve wet performance of the tire. At the same time, since the closed lug grooves do not open to the circumferential main groove or a tire ground contact edge, rigidity of the left and right land portions defined by the circumferential narrow groove is ensured. These have an advantage that the wet performance and dry performance of the tire are efficiently provided in a compatible manner. Additionally, (2) since the plurality of types of the closed lug grooves having the mutually different extension lengths are arranged at a predetermined interval in a tire circumferential direction, naturally, the terminating end portions of the closed lug grooves in at least one land portion are arranged in the tire circumferential direction while mutually offsetting in the tire width direction. Therefore, compared to a configuration in which the left and right terminating end portions of the closed lug grooves are arranged with the positions in the tire width direction aligned, the long lug groove portions are disposed on a road contact surface of the one land portion, and wide ground contact regions are formed between the adjacent long lug grooves at the same time. This has an advantage that the wet performance and the dry performance of the tire are efficiently improved.

BRIEF DESCRIPTION OF DRAWINGS

FIG. 10 is a table showing results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
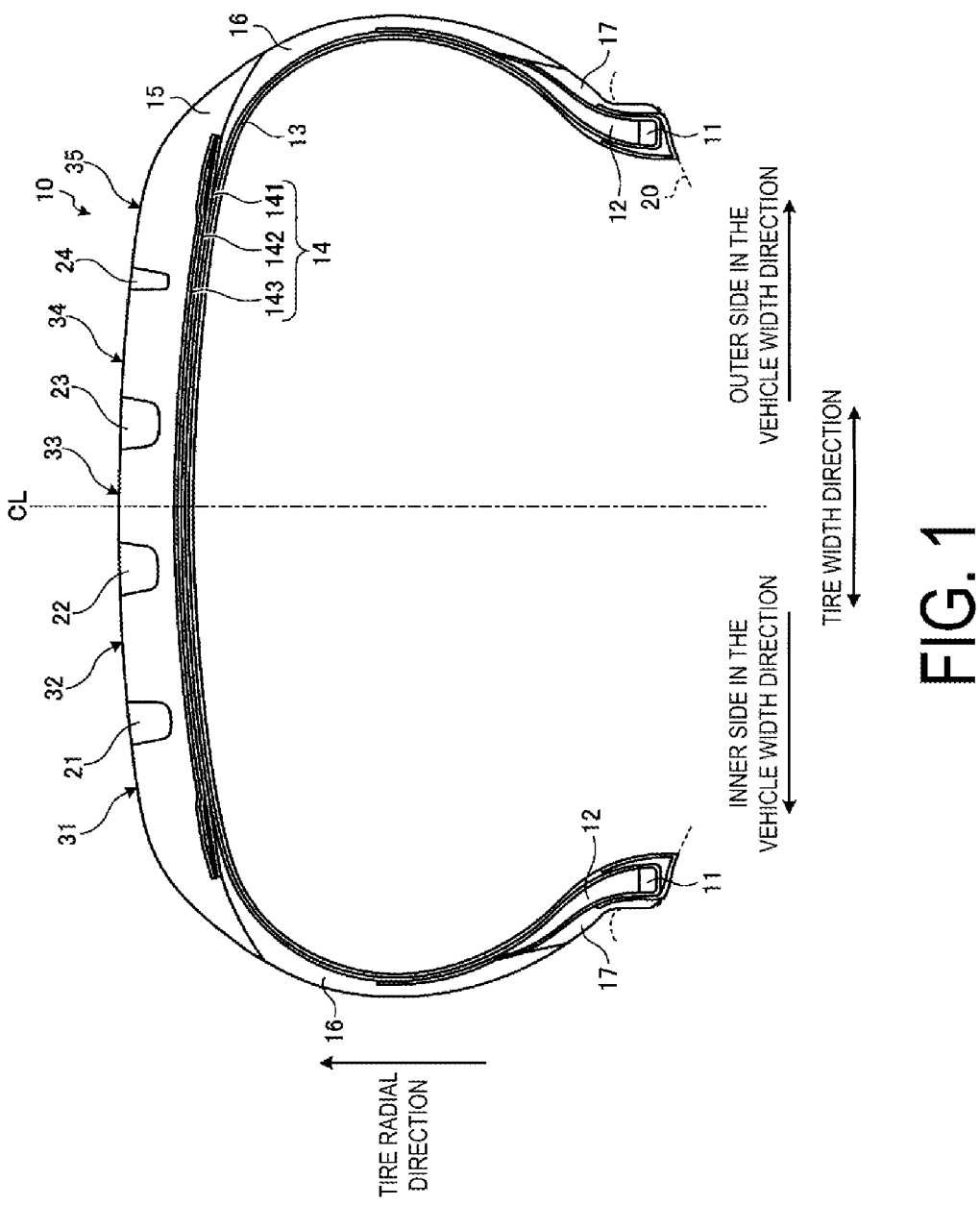
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

Furthermore, an inner side in the vehicle width direction and an outer side in the vehicle width direction are defined as directions with respect to the vehicle width direction when the tire is mounted on the vehicle. Additionally, right and left regions demarcated by the tire equatorial plane are defined as the region outer side in the vehicle width direction and the region inner side inner side in the vehicle width direction, respectively. The pneumatic tire includes a mounting direction indicator portion (not illustrated) that indicates a tire mounting direction with respect to the vehicle. The mounting direction indicator portion, for example, is constituted by a mark or ridges/grooves on the sidewall portion of the tire. For example, Economic Commission for Europe Regulation 30 (ECE R30) requires that an indicator portion in the vehicle mounting direction is provided on the sidewall portion outer side in the vehicle width direction when the tire is mounted on the vehicle.

A pneumatic tire 10 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by annularly and multiply winding one or a plurality of bead wires made of steel. The pair of bead cores 11, 11 are embedded in bead portions to constitute cores of the left and right bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of layered carcass plies, and extends between the left and right bead cores 11, 11 in a toroidal shape, forming the framework of the tire. Additionally, both end portions of the carcass layer 13 are turned back outwardly in the tire width direction so as to wrap around the bead cores 11 and the bead fillers 12 and fixed. The carcass ply (plies) of the carcass layer 13 is made by performing a rolling process on a plurality of coating rubber-covered carcass cords made of steel or an organic fiber material (e.g. aramid, nylon, polyester, rayon, or the like). The carcass ply (plies) has a carcass angle (defined as an inclination angle of a longitudinal direction of the carcass cords with respect to the tire circumferential direction), as an absolute value ranging from 80 degrees to 90 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as inclination angles of the longitudinal direction of the belt cords with respect to the tire circumferential direction) of mutually different signs, and the cross belts 141, 142 are layered so that the longitudinal directions of the belt cords intersect with one another (so-called crossply structure). The belt cover 143 is made by covering belt cover cords made of steel or an organic fiber material with a coating rubber. The belt cover 143 has a belt angle, as an absolute value, ranging from 0 degrees to 10 degrees. Further, the belt cover 143 is, for example, a strip material formed by covering one or more belt cover cords with a coating rubber and can be formed by winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire width direction and constitute left and right sidewall portions. The pair of respective rim cushion rubbers 17, 17 are disposed inward of the left and right bead cores 11, 11 and the turned back portions of the carcass layer 13 in the tire radial direction to constitute rim fitting surfaces of the bead portions.

Tread Pattern

Figure 2:
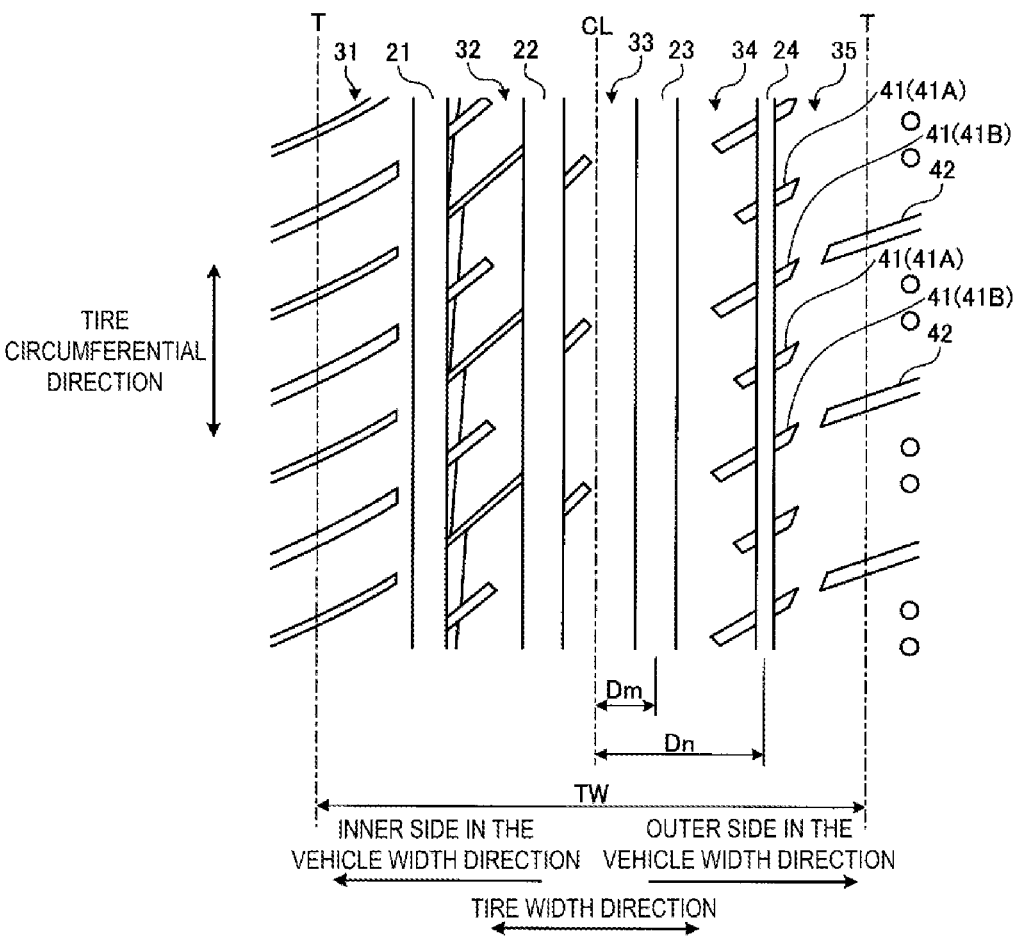
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern of an all-season tire. In reference to the same drawing, "tire circumferential direction" refers to the direction revolving about the tire rotation axis. Reference sign T denotes a tire ground contact edge, and a dimension symbol TW denotes a tire ground contact width.

As illustrated in FIG. 2, the pneumatic tire 10 includes, in the tread surface, a plurality of circumferential main grooves 21 to 23 and a circumferential narrow groove 24 extending in the tire circumferential direction, and a plurality of land portions 31 to 35 defined by the circumferential grooves 21 to 24.

"Main groove" refers to a groove on which a wear indicator must be provided as specified by JATMA (The Japan Automobile Tyre Manufacturers Association, Inc.) and typically has a groove width of 3.0 mm or greater and a groove depth of 6.0 mm or greater. Lug grooves described later are lateral grooves extending in the tire width direction and open when the tire comes into contact with the ground to function as grooves. A sipe described later is a cut formed in a tread contact surface and distinguished from the lug groove in that the sipe closes when the tire comes into contact with the ground.

Note that the circumferential narrow groove 24 will be described later.

The groove width is the maximum distance between the left and right groove walls at the groove opening portion and is measured when the tire is mounted on a specified rim, inflated to the specified internal pressure, and in an unloaded state. In a configuration in which the land portions include notch portions or chamfered portions on edge portions thereof, the groove widths are measured with points where the tread contact surface and extension lines of the groove walls meet as measured points, in a cross-sectional view normal to the groove length direction. Additionally, in a configuration in which the grooves extend in a zigzag-like or wave-like manner in the tire circumferential direction, the groove width is measured with the center line of amplitude of the groove walls as the measured point.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO. Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO (The European Tyre and Rim Technical Organisation). Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 10 has a left-right symmetric tread pattern with respect to a tire equatorial plane CL. Additionally, the region inner side in the vehicle width direction demarcated by the tire equatorial plane CL includes two circumferential main grooves 21, 22 and a region outer side in the vehicle width direction includes one circumferential main groove 23 and one circumferential narrow groove 24. These circumferential grooves 21, 22; 23, 24 are disposed being left-right symmetric with respect to the tire equatorial plane CL. Five rows of the land portions 31 to 35 are defined by the circumferential grooves 21 to 24. In addition, one land portion 33 is disposed on the tire equatorial plane CL.

Moreover, the land portion 31, 35 located outer side in the tire width direction that is defined by the outermost circumferential main groove 21 in the region inner side in the vehicle width direction or the circumferential narrow groove 24 in the region outer side in the vehicle width direction is defined as a shoulder land portion. The shoulder land portions 31, 35 are land portions located outermost in the tire width direction and positioned on the tire ground contact edges T. Furthermore, land portions 32, 34 inner side in the tire width direction defined by the outermost circumferential main groove 21 or the circumferential narrow groove 24 are defined as second land portions. Accordingly, the second land portions 32, 34 are adjacent to the shoulder land portions 31, 35 with the outermost circumferential main groove 21 and circumferential narrow groove 24 disposed therebetween. Furthermore, the land portion 33 located closer to the tire equatorial plane CL than the second land portions 32, 34 is defined as a center land portion.

Region Outer Side in the Vehicle Width Direction

In the configuration of FIG. 2, the region outer side in the vehicle width direction demarcated by the tire equatorial plane CL includes the single circumferential main groove 23 and the single circumferential narrow groove 24 disposed outward of the circumferential main groove 23 in the tire width direction. Additionally, the shoulder land portion 35 and the second land portion 34 are defined by the circumferential grooves 23, 24.

For example, in the configuration of FIG. 2, the circumferential main groove 23 and the circumferential narrow groove 24 have a straight shape with a constant groove width. A distance Dm from the tire equatorial plane CL to the groove center line of the circumferential main groove 23 is in a range of from not less than 8% to not greater than 12% to the tire ground contact width TW. A distance Dn from the tire equatorial plane CL to the groove center line of the circumferential narrow groove 24 is in a range of from not less than 26% to not greater than 32% to the tire ground contact width TW.

The groove center line of the circumferential main groove is defined as a straight line passing through the midpoint of left and right measured points of the groove width of the circumferential main groove and parallel to the tire circumferential direction.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Additionally, a groove width of the circumferential main groove 23 is in a range of from not less than 5.0 mm to not greater than 25.0 mm, and the groove depth is in a range of from not less than 5.0 mm to not greater than 12.0 mm (dimension symbols are omitted in the drawings). Additionally, a groove width Ws (see FIG. 4 described later) of the circumferential narrow groove 24 is in a range of from not less than 3.0 mm to not greater than 7.0 mm, and the groove depth is in a range of from not less than 3.0 mm to not greater than 7.0 mm (dimension symbols are omitted in the drawings).

Additionally, in the configuration of FIG. 2, edge portions on the circumferential main groove 23 side of the left and right land portions 33, 34 defined by the circumferential main groove 23 in the region outer side in the vehicle width direction have a plain structure that does not have a sipe or an opening of a groove and thus extend continuously in the tire circumferential direction. Thus, noise performance of the tire is enhanced.

Closed Lug Grooves in the Region Outer Side in the Vehicle Width Direction

Figure 3:
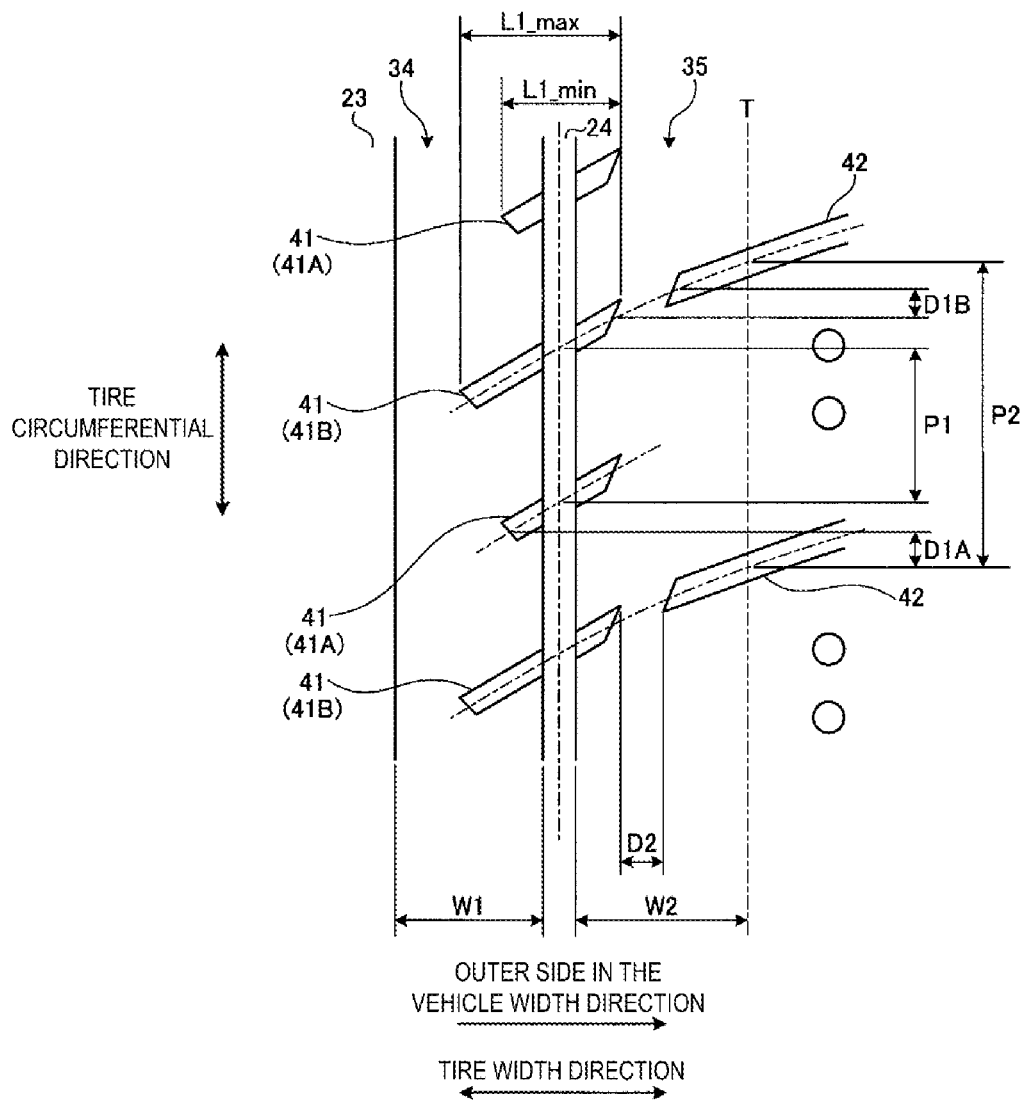
FIG. 3 is an enlarged view illustrating a main portion of a region outer side in a vehicle width direction of the pneumatic tire illustrated in FIG. 2.
Figure 4:
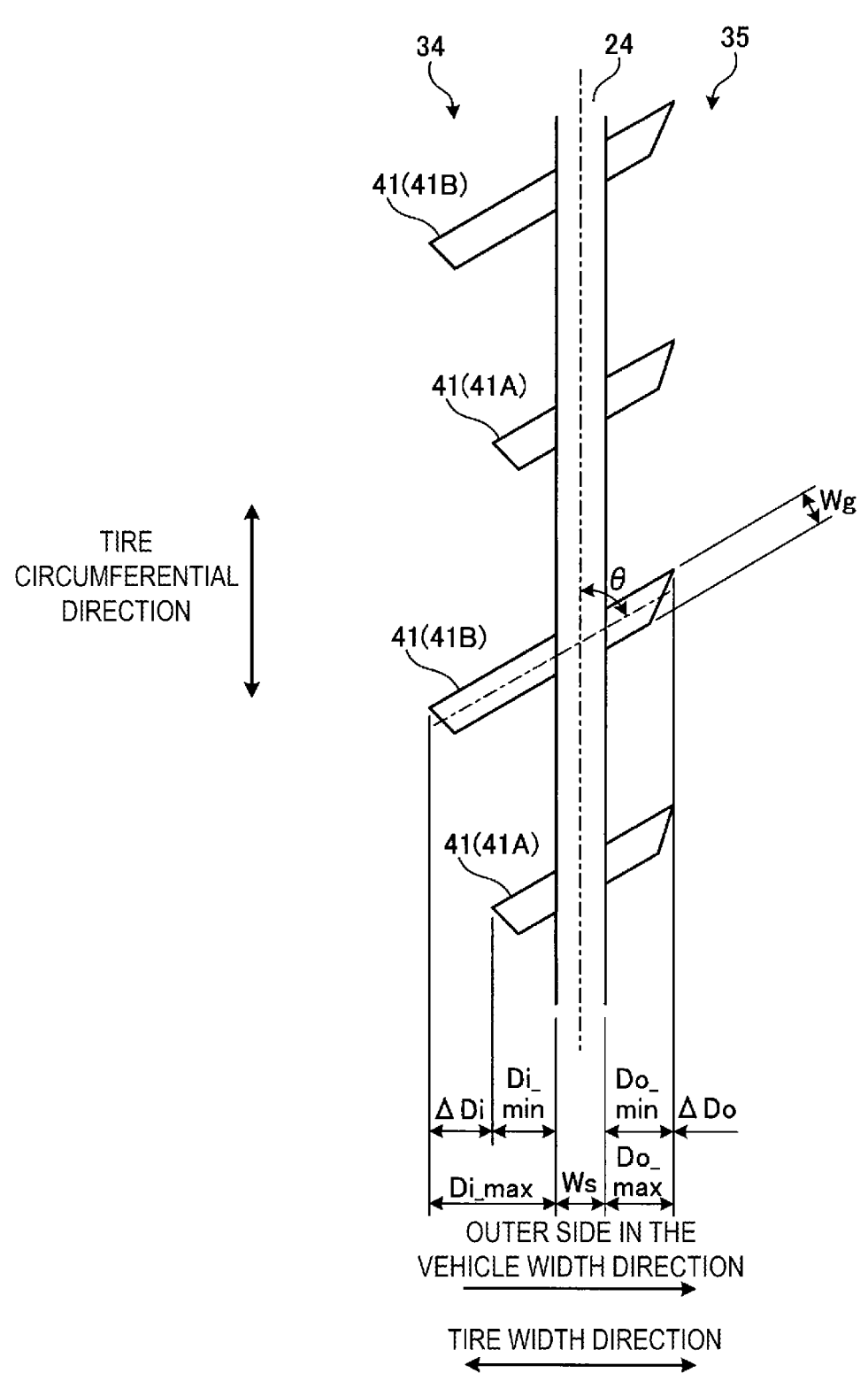
FIG. 4 is an explanatory diagram illustrating closed lug grooves of the pneumatic tire illustrated in FIG. 3.

FIG. 3 is an enlarged view illustrating a main portion of a region outer side in a vehicle width direction of the pneumatic tire illustrated in FIG. 2. FIG. 4 is an explanatory diagram illustrating closed lug grooves of the pneumatic tire illustrated in FIG. 3. In these drawings, FIG. 3 illustrates the second land portion 34 and the shoulder land portion 35 in the region outer side in the vehicle width direction, and FIG. 4 illustrates an enlarged view in which the circumferential narrow groove 24 and a plurality of closed lug grooves 41 are extracted.

As illustrated in FIG. 2, the pneumatic tire 10 includes the circumferential narrow groove 24 described above and the plurality of closed lug grooves 41 (41A, 41B) in the region outer side in the vehicle width direction.

The closed lug grooves 41 extend in the tire width direction, penetrate the circumferential narrow groove 24, and terminate inside the second land portion 34 and the shoulder land portion 35 without opening to the circumferential main groove 23 or the tire ground contact edge T. Therefore, the closed lug grooves 41 branch in the tire width direction from the circumferential narrow groove 24 like branches and terminate inside the left and right land portions 34, 35. Here, a terminating end portion inner side in the tire width direction of the closed lug groove 41 is simply referred to as an "inner terminating end portion" and a terminating end portion outer side in the tire width direction is simply referred to as an "outer terminating end portion." Additionally, the plurality of the closed lug grooves 41 (41A, 41B) are arranged at a predetermined interval in the tire circumferential direction.

In the configuration described above, the closed lug grooves 41 penetrating the circumferential narrow groove 24 improve drainage properties in the vicinity of the circumferential narrow groove 24 to improve wet performance of the tire. At the same time, since the closed lug grooves 41 do not open to the circumferential main groove 23 or the tire ground contact edge T, rigidity of the left and right land portions 34, 35 defined by the circumferential narrow groove 24 is ensured. Thus, the wet performance and dry performance of the tire are efficiently provided in a compatible manner.

Additionally, as illustrated in FIG. 3, the plurality of types of closed lug grooves 41 (41A, 41B) having mutually different extension lengths are disposed in a mixed manner. In addition, among the plurality of types of closed lug grooves 41, an extension length L1_min of the shortest closed lug groove 41A and an extension length L1_max of the longest closed lug groove 41B preferably have a relationship $1.10 \leq L1\_max/L1\_min \leq 3.00$ and more preferably have a relationship $1.20 \leq L1\_max/L1\_min \leq 1.60$. The ranges of the extension lengths L1 of the closed lug grooves 41 are not particularly limited, but are subject to restrictions by ranges of distances Di, Do (see FIG. 4) of the terminating end portions of the closed lug grooves 41 in the respective land portions 34, 35 described later.

The extension lengths L1 of the lug grooves are defined as distances in the tire width direction from the inner terminating end portions to the outer terminating end portions of the lug grooves when the tire is mounted on the specified rim, inflated to the specified internal pressure, and in an unloaded state. In a configuration in which three or more types of closed lug grooves having mutually different extension lengths are provided, the extension lengths L1_min of the shortest first closed lug grooves and the extension lengths L1_max of the longest second closed lug grooves are each measured.

For example, in the configuration of FIG. 3, the plurality of closed lug grooves 41 (41A, 41B) are arranged at the predetermined interval in the tire circumferential direction. Moreover, the closed lug grooves 41A, 41B intersect with only the circumferential narrow groove 24 and are not connected to the other grooves or sipes. Additionally, the second land portion 34 and the shoulder land portion 35 are not divided in the tire circumferential direction by the lug grooves or sipes, and have a road contact surface continuous in the tire circumferential direction. Additionally, the first and second closed lug grooves 41A, 41B are arranged parallel to one another by inclination of their longitudinal directions in a same direction and at a same inclination angle with respect to the tire circumferential direction. However, inclination angles θ of the plurality of closed lug grooves 41A, 41B may be different within a range described later.

Additionally, in FIG. 3, ground contact widths W1 and W2 of the second land portion 34 and the shoulder land portion 35 preferably have a relationship $1.00 \leq W2/W1 \leq 2.00$ and more preferably have a relationship $1.20 \leq W2/W1 \leq 1.40$. Additionally, the ground contact width W1 of the second land portion 34 preferably has a relationship $0 \leq W1/TW \leq 0.30$ to the tire ground contact width TW. Thus, the ground contact widths W1, W2 of the left and right land portions 34, 35 defined by the circumferential main groove 23 and the circumferential narrow groove 24 are made appropriate.

The ground contact width of the land portion is measured as the maximum linear distance in the tire axial direction of a contact surface between the tire and a flat plate when the tire is mounted on the specified rim, inflated to the specified internal pressure, placed perpendicular to the flat plate in a static state, and loaded with a load corresponding to the specified load.

Additionally, the plurality of the closed lug grooves 41 (41A, 41B) are arranged such that at least one of the terminating end portions are mutually offset in the tire width direction. At this time, the terminating end portions of the closed lug grooves 41 may be offset on the second land portion 34 side (see FIG. 3) or, as described later, may be offset on the shoulder land portion 35 side, or may be offset on both the second land portion 34 side and the shoulder land portion 35 side. Additionally, the plurality of types of closed lug grooves 41A, 41B having the mutually different lengths are arranged in a predetermined order in the tire circumferential direction. At this time, the two types of the closed lug grooves 41A, 41B may be arranged in alternation in the tire circumferential direction (see FIG. 3), or three or more types of the closed lug grooves 41 may be arranged as described later.

Additionally, in FIG. 4, the distance Di from the circumferential narrow groove 24 to the inner terminating end portions of the closed lug grooves 41 (41A, 41B) (including a minimum value Di_min and a maximum value Di_max in FIG. 4) and the ground contact width W1 (see FIG. 3) of the second land portion 34 preferably have a relationship $0.10 \leq Di/W1 \leq 0.80$ and more preferably have a relationship $0.20 \leq Di/W1 \leq 0.40$. Accordingly, the extension lengths Di in the tire width direction of the closed lug grooves 41 in the second land portion 34 are made appropriate.

Also, in FIG. 4, a distance Do (including a minimum value Do_min and a maximum value Do_max in FIG. 4) from the circumferential narrow groove 24 to the outer terminating end portions of the closed lug grooves 41 (41A, 41B) and the ground contact width W2 (see FIG. 3) of the shoulder land portion 35 preferably have a relationship $0.10 \leq Do/W2 \leq 0.60$ and more preferably have a relationship $0.20 \leq Do/W2 \leq 0.40$. As a result, the extension lengths in the tire width direction of the closed lug grooves 41 in the shoulder land portion 35 are made appropriate.

The distances Di, Do to the terminating end portions of the lug grooves are measured as distances in the tire width direction from measured points of the ground contact widths W1, W2 of the land portions to the terminating end portions of the lug grooves when the tire is mounted on a specified rim, inflated to the specified internal pressure, and in an unloaded state. In addition, in configuration in which three or more types of the distances Di and Do having mutually different values are present, the maximum values Di_max, Do_max and the minimum values of Di_min, Do_min of the distances Di and Do each need to meet the conditions described above.

In FIG. 4, the minimum value Di_min and the maximum value Di_max of the distance Di of the inner terminating end portions of the plurality of closed lug grooves 41 (41A, 41B) preferably have a relationship $1.10 \leq Di\_max/Di\_min \leq 3.00$ and more preferably have a relationship $1.20 \leq Di\_max/Di\_min \leq 1.60$. Additionally, an offset amount ΔDi in the tire width direction of the inner terminating end portions of the closed lug grooves 41 preferably has a relationship $0.10 \leq \Delta Di/W1 \leq 0.60$ to the ground contact width W1 (see FIG. 3) of the second land portion 34 and more preferably has a relationship $0.20 \leq \Delta Di/W1 \leq 0.40$. Accordingly, in the second land portion 34, the terminating end portions of the closed lug grooves 41A, 41B are arranged offset in the tire width direction. As a result, the positions of the inner terminating end portions of the closed lug grooves 41A, 41B in the second land portion 34 are made appropriate, and the wet performance and the dry performance of the tire are provided in a compatible manner. In particular, since the contribution to the wet performance is great in the second land portion 34, the wet performance of the tire is efficiently improved by the configuration described above.

On the other hand, the minimum value Do_min and the maximum value Do_max of the distance Do of the outer terminating end portions of the plurality of closed lug grooves 41 (41A, 41B) preferably have a relationship $0.90 \leq$ Do_max/Do_min $\leq 1.10$ and more preferably have a relationship $0.95 \leq$ Do_max/Do_min $\leq 1.05$. Additionally, an offset amount $\Delta$Do in the tire width direction of the outer terminating end portions of the closed lug grooves 41 preferably has a relationship $0 \leq \Delta$Do/W2$\leq 0.10$ to the ground contact width W2 (see FIG. 3) of the shoulder land portion 35 and more preferably has a relationship $0 \leq \Delta$Do/W2$\leq 0.05$. Therefore, in the shoulder land portion 35, the terminating end portions of the closed lug grooves 41A, 41B are arranged with the positions in the tire width direction aligned. As a result, the rigidity of the shoulder land portion 35 can be properly ensured, so dry braking performance of the tire is improved.

The offset amounts $\Delta$Di and $\Delta$Do of the terminating end portions of the lug grooves are calculated as differences between the maximum values Di_max, Do_max and the minimum values Di_min, Do_min of the distances Di, Do from the circumferential narrow groove to the terminating end portions.

Also, as illustrated in FIG. 4, the plurality of closed lug grooves 41 (41A, 41B) are disposed so that their longitudinal directions are inclined in the same direction with respect to the tire circumferential direction. Additionally, the closed lug groove 41 has the inclination angle $\theta$ with respect to the tire circumferential direction preferably in a range 50 degrees$\leq\theta\leq$80 degrees and more preferably in a range 55 degrees$\leq\theta\leq$75 degrees. As a result, the drainage properties of the closed lug grooves 41 are improved, and pattern noise of the tire caused by the closed lug grooves 41 is reduced.

The inclination angle $\theta$ of the lug grooves is measured as an angle formed by a straight line connecting both end portions of the groove center line of the lug groove and the tire circumferential direction.

Additionally, an inclination angle $\theta 1$ of the closed lug groove 41 having the smallest inclination angle $\theta$ and an inclination angle $\theta 2$ of the closed lug groove 41 having the largest inclination angle $\theta$ preferably have a relationship 0 degrees$\leq\theta 2-\theta 1\leq 10$ degrees and more preferably have a relationship 0 degrees$\leq\theta 2-\theta 1\leq 5$ degrees. In other words, the inclination angles $\theta$ of the closed lug grooves 41 are preferably approximately constant. As a result, the rigidity of the land portion can be properly ensured, so uneven wear is suppressed.

Additionally, a groove width Wg of the closed lug groove 41 and the groove width Ws of the circumferential narrow groove 24 preferably have a relationship $0.30 \leq$ Wg/Ws$\leq 1.30$ and more preferably have a relationship $0.60 \leq$ Wg/Ws$\leq 1.00$. As a result, a drainage action of the closed lug grooves 41 is properly ensured.

Additionally, a groove width Wg_min of the narrowest closed lug groove 41 and a groove width Wg_max (not illustrated) of the widest closed lug groove 41 preferably have a relationship $0.90 \leq$ Wg_max/Wg_min$\leq 1.10$ and more preferably have a relationship $0.95 \leq$ Wg_max/Wg_min$\leq 1.05$. In other words, the groove widths Wg_min of the closed lug grooves 41 are preferably uniform. As a result, the rigidity of the land portion can be properly ensured, so uneven wear is suppressed.

For example, in the configuration of FIG. 4, the closed lug grooves 41 have the straight shape with constant groove widths as a whole and have a tapered shape with a narrowed groove width at their terminating end portions. Additionally, by narrowing the groove widths of the left and right terminating end portions of the closed lug groove 41 in the same direction in the tire circumferential direction, the entire closed lug groove 41 has a trapezoidal shape having an upper bottom and a lower bottom in the tire circumferential direction. Additionally, the plurality of closed lug grooves 41A, 41B are arranged in the same direction in the tire circumferential direction. However, the configuration is not limited to this, and the terminating end portions of the closed lug groove 41 may have a rectangular shape or an arc shape (not illustrated). Furthermore, the entire closed lug groove 41 may have a rectangular shape or a parallelogram shape (not illustrated).

Shoulder Lug Grooves in the Region Outer Side in the Vehicle Width Direction

As illustrated in FIG. 2, the shoulder land portion 35 in the region outer side in the vehicle width direction includes a plurality of shoulder lug grooves 42 in the region outer side in the vehicle width direction.

The shoulder lug groove 42 has one terminating end portion inside the shoulder land portion 35, extends in the tire width direction, and opens to the tire ground contact edge T. Additionally, the shoulder lug groove 42 does not communicate with the circumferential narrow grooves 24 or the closed lug groove 41 and does not overlap in the tire width direction. Additionally, the plurality of shoulder lug grooves 42 are arranged at a predetermined interval in the tire circumferential direction.

Also, as illustrated in FIG. 3, the long closed lug groove 41B is on an extension line of the groove center line of the shoulder lug groove 42. Specifically, the groove center line of the shoulder lug groove 42 has a gentle arc shape, and the closed lug groove 41B extends including the extension line of the groove center line of the shoulder lug groove 42. In such a configuration, the shoulder lug grooves 42 extend along the extension lines of the closed lug grooves 41B, thereby improving the drainage properties from the second land portion 34 to the shoulder land portion 35. Note that the configuration is not limited to the one described above, and the short closed lug groove 41A may be on the extension line of the groove center line of the shoulder lug groove 42 (not illustrated).

Also, as illustrated in FIG. 3, the positional relationship between the shoulder lug grooves 42 and the closed lug grooves 41 in the tire circumferential direction is set so that the groove center lines of the closed lug grooves 41 (41A, 41B) do not overlap with the groove center lines of the shoulder lug grooves 42 in the tire circumferential direction. Specifically, distances D1A, D1B between end portions of the groove center lines of the closed lug grooves 41A, 41B and end portions of the groove center lines of the shoulder lug grooves 42 in the tire circumferential direction in FIG. 3 are set in ranges $0 \leq$D1A and $0 \leq$D1B. As a result, the pattern noise caused by the overlap of the lug grooves is reduced, and quietness of the tire is improved.

The end portion of the groove center line of the lug groove is defined as a point where the terminating end portion of the opening of the lug groove meets the groove center line of the lug groove on the road contact surface of the land portion.

Also, as illustrated in FIG. 3, the terminating end portion of the shoulder lug groove 42 and the outer terminating end portion of the closed lug groove 41B opposed to the shoulder lug groove 42 are mutually separated in the tire width direction. Additionally, the shoulder lug groove 42 and the closed lug groove 41B are not connected with another groove or sipe. Additionally, a distance D2, which is from the terminating end portion of the shoulder lug grooves 42 to the outer terminating end portion of the closed lug groove 41B in the tire width direction, and the ground contact width W2 of the shoulder land portion 35 preferably have a relationship 0.10≤D2/W2≤0.60 and more preferably have a relationship 0.30≤D2/W2≤0.50. As a result, the wet performance and the dry performance of the tire are provided in a compatible manner. That is, the lower limit ensures the rigidity and a ground contact region of the shoulder land portion 35 and ensures the dry performance of the tire. Also, the upper limit ensures the extension lengths of the closed lug grooves 41 and the shoulder lug grooves 42 in the tire width direction and ensures the wet performance of the tire.

Furthermore, in the configuration of FIG. 3, the shoulder land portion 35 has a plain road contact surface continuous in the tire circumferential direction without divided by a groove or a sipe in a region between all of the terminating end portions of the shoulder lug grooves 42 and all of the outer terminating end portions of the closed lug grooves 41 (41A, 41B). In other words, the shoulder lug grooves 42 and the closed lug grooves 41 do not mutually overlap in the tire width direction. This further improves the dry performance of the tire.

Additionally, in FIG. 3, an arrangement interval P1 of the closed lug grooves 41 and an arrangement interval P2 of the shoulder lug grooves 42 in the tire circumferential direction preferably have a relationship 0.30≤P1/P2≤0.70 and more preferably have a relationship 0.40≤P1/P2≤0.60. As a result, the arrangement intervals P1, P2 of the closed lug grooves 41 and the shoulder lug grooves 42 are made appropriate. In the configuration of FIG. 3, a pair of the closed lug grooves 41A, 41B as one set of the short closed lug groove 41A and the long closed lug groove 41B and one shoulder lug groove 42 are arranged in the tire circumferential direction at mutually same pitch length.

The arrangement intervals P1, P2 of the lug grooves are measured using meeting points of the groove center lines of the lug grooves and the groove center line of the circumferential narrow groove or the tire ground contact edge as measured points.

MODIFIED EXAMPLES

FIG. 5 to FIG. 9 are explanatory diagram illustrating the modified example of the closed lug grooves illustrated in FIG. 4. In these drawings, constituents that are the same as constituents illustrated in FIG. 4 have the same reference signs, and explanations thereof are omitted.

In the configuration of FIG. 4, as described above, the outer terminating end portions of the closed lug grooves 41 (41A, 41B) in the shoulder land portion 35 are arranged with the positions in the tire width direction aligned. Thus, the offset amount ΔDo in the tire width direction of the outer terminating end portions of the closed lug grooves 41 is zero.

Figure 5:
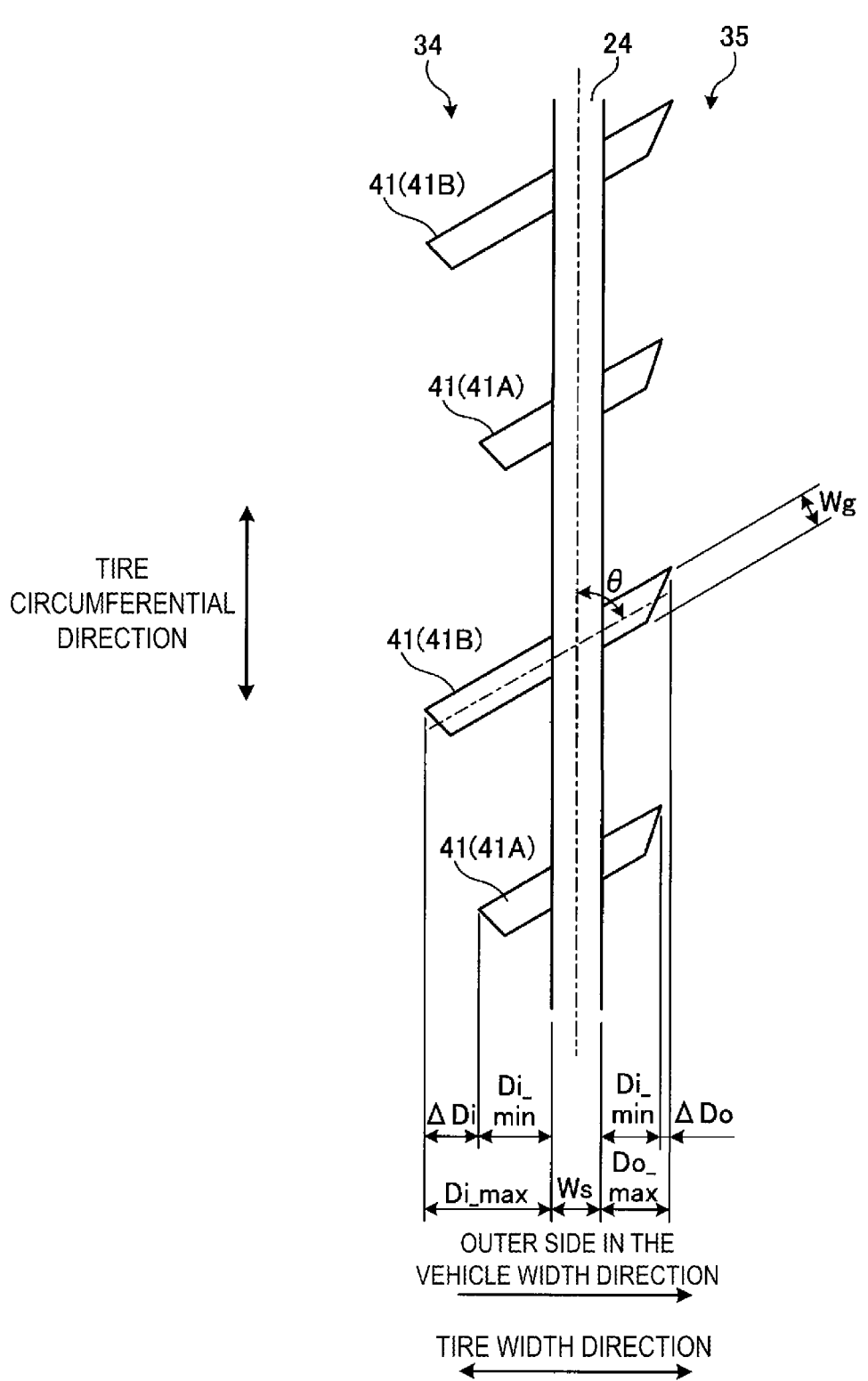
FIG. 5 is an explanatory diagram illustrating a modified example of the closed lug grooves illustrated in FIG. 4.

In contrast, in the configuration of FIG. 5, the outer terminating end portions of the closed lug grooves 41 (41A, 41B) in the shoulder land portion 35 are arranged to be slightly offset from one another in the tire width direction. Specifically, the offset amount ΔDo of the outer terminating end portions of the closed lug grooves 41 is set so as not to be zero within a predetermined range to the ground contact width W2 of the shoulder land portion 35. In such a configuration as well, the rigidity of the shoulder land portion 35 can be properly ensured.

Figure 6:
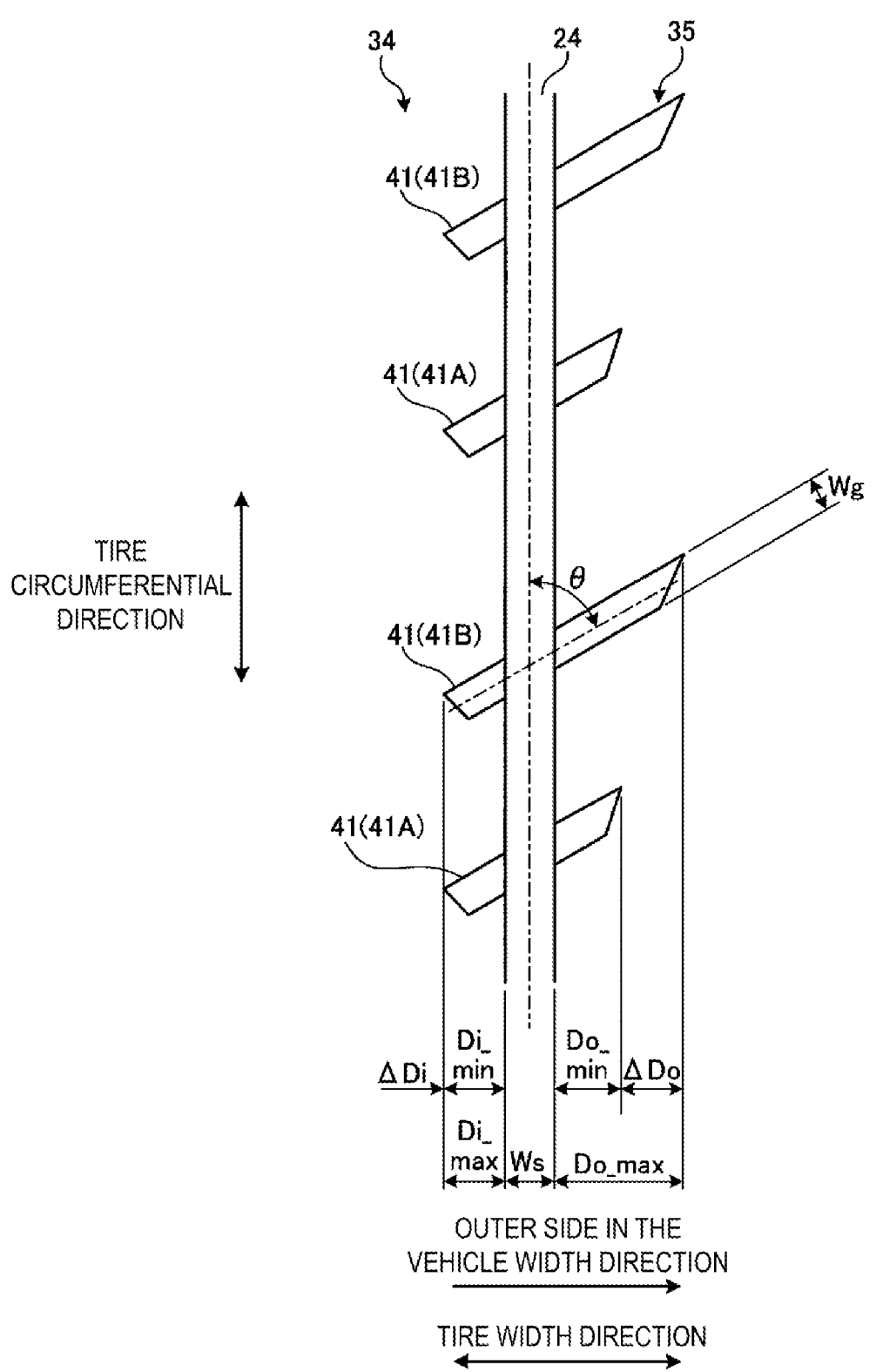
FIG. 6 is an explanatory diagram illustrating a modified example of the closed lug grooves illustrated in FIG. 4.

Additionally, in the configuration of FIG. 6, opposite from the configuration of FIG. 4, the terminating end portions of the closed lug grooves 41 (41A, 41B) are arranged with the positions in the tire width direction aligned in the second land portion 34 and are arranged offset in the tire width direction in the shoulder land portion 35. In this case, it is preferred that the offset amount ΔDi of the inner terminating end portions of the closed lug grooves 41 has a relationship 0≤ΔDi/W1≤0.05 to the ground contact width W1 of the second land portion 34, and the offset amount ΔDo of the outer terminating end portions of the closed lug grooves 41 has a relationship 0.10≤ΔDo/W2≤0.60 to the ground contact width W2 of the shoulder land portion 35.

Figure 7:
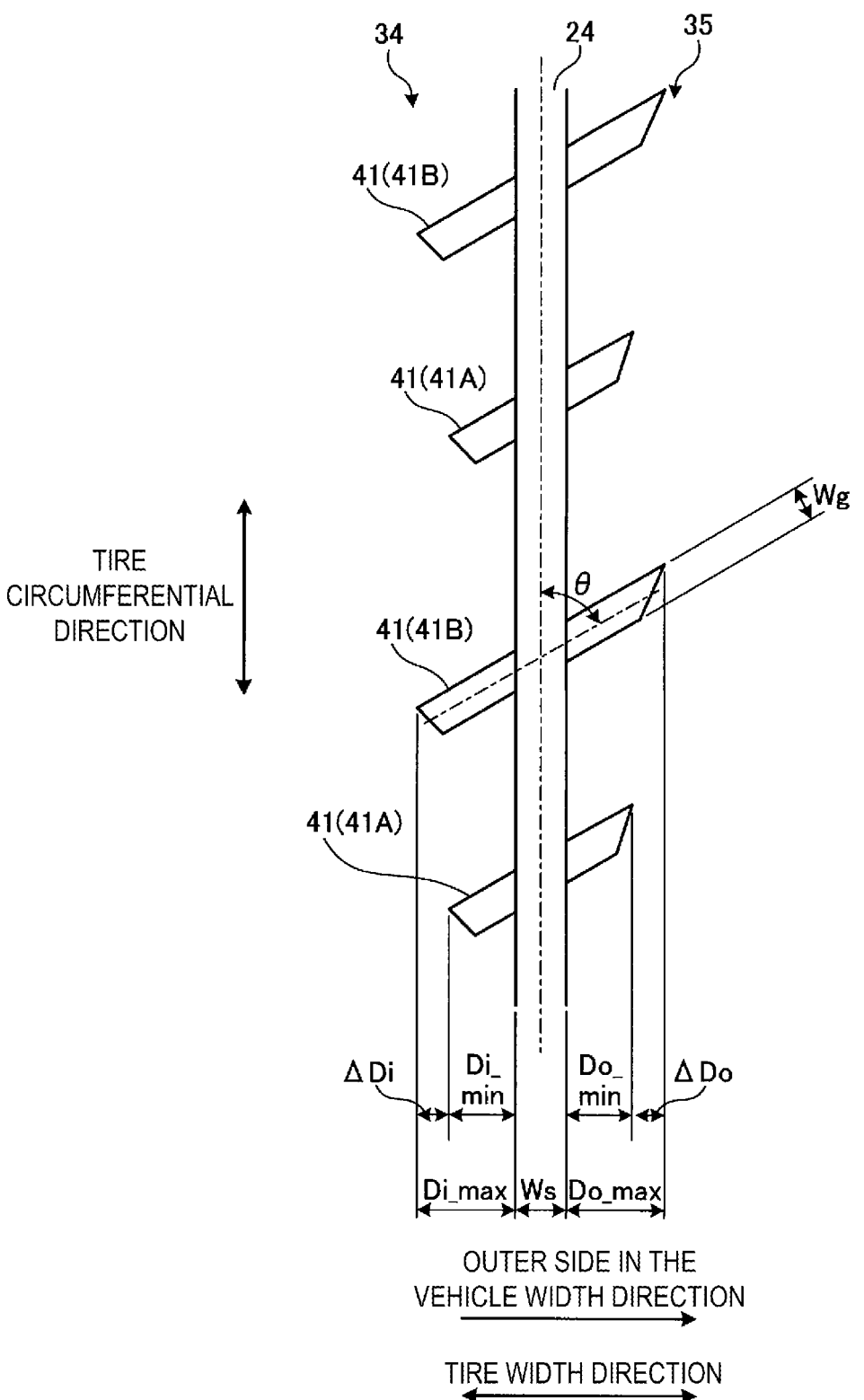
FIG. 7 is an explanatory diagram illustrating a modified example of the closed lug grooves illustrated in FIG. 4.

Also, in the configuration of FIG. 7, different from the configurations of FIG. 4 and FIG. 6, center positions of the closed lug grooves 41 (41A, 41B) in the tire width direction are arranged to be aligned. In this case, a distance (not illustrated) between the center point in the tire width direction of the closed lug groove 41 and the groove center line of the circumferential narrow groove 24 is preferably within a range of 50% or less to the groove width Ws of the circumferential narrow groove 24. In other words, the center point in the tire width direction of the closed lug groove 41 is preferably inside the circumferential narrow groove 24.

Also, in the configuration of FIG. 4, as described above, the two types of the closed lug grooves 41A, 41B having mutually different lengths are arranged in alternation in the tire circumferential direction. Additionally, the total number of the closed lug grooves 41 (41A, 41B) is twice the total number of the shoulder lug grooves 42, and the total number of the long closed lug grooves 41B is set to be the same as the total number of the shoulder lug grooves 42 (see FIG. 3).

Figure 8:
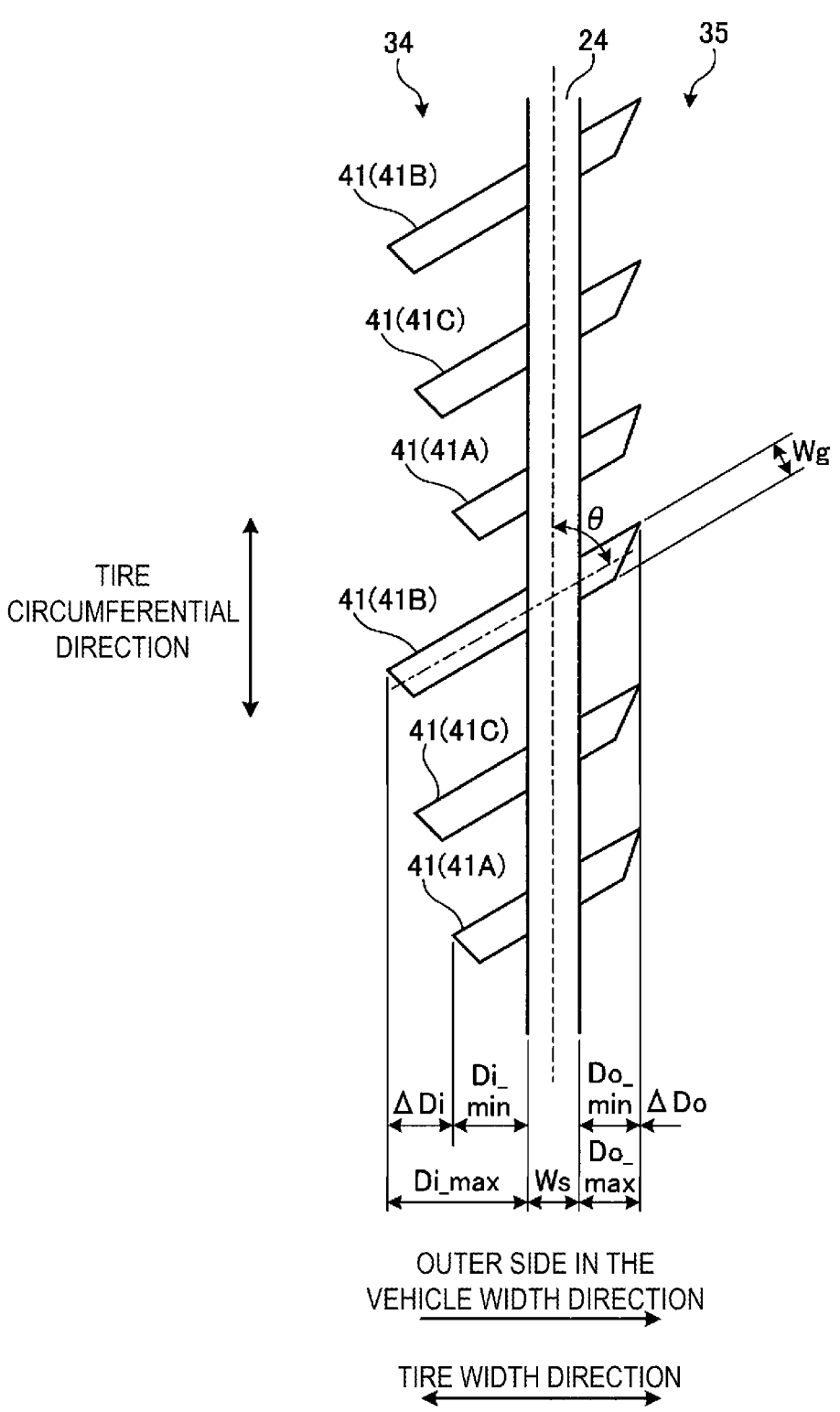
FIG. 8 is an explanatory diagram illustrating a modified example of the closed lug grooves illustrated in FIG. 4.

However, no such limitation is intended, and as illustrated in FIG. 8, three types of closed lug grooves 41A to 41C having mutually different lengths may be arranged in a predetermined arrangement order in the tire circumferential direction. For example, in the configuration of FIG. 8, the closed lug grooves 41A to 41C are repeatedly arranged in the order of the short length, the medium length, and the long length from downward to upward in the same drawing. The extension length L1_min of the shortest closed lug groove 41A and the extension length L1_max (see FIG. 3) of the longest closed lug groove 41B are set so as to have a relationship 1.10≤L1_max/L1_min≤3.00. Additionally, it is preferred that the total number of the closed lug grooves 41 (41A to 41C) is three times the total number of the shoulder lug grooves 42, and the total number of the long closed lug grooves 41B is set to be the same as the total number of the shoulder lug grooves 42. As a result, the shoulder lug grooves 42 can be disposed on extension lines of the groove center lines of the long closed lug grooves 41B in a one-to-one correspondence with the long closed lug grooves 41B.

Figure 9:
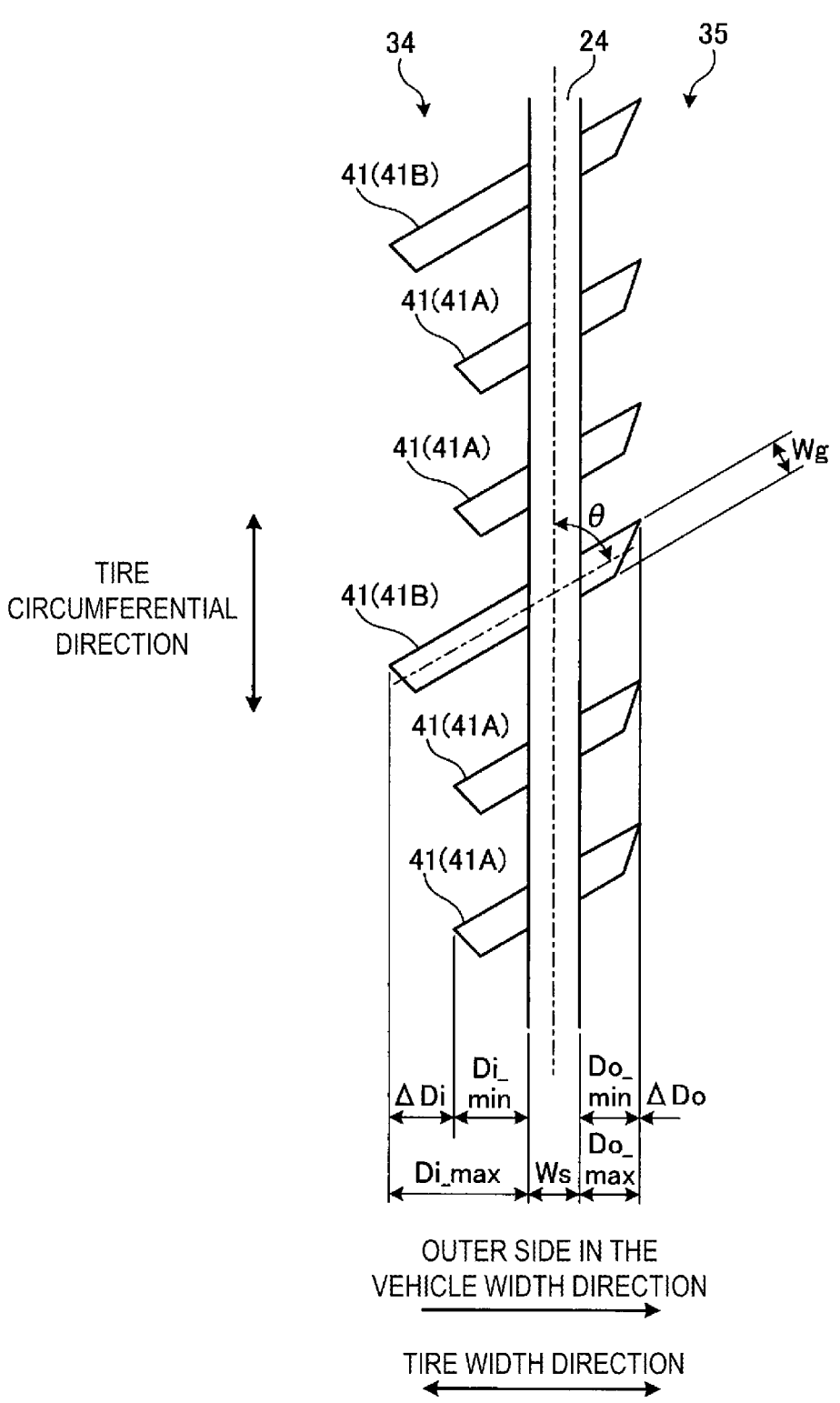
FIG. 9 is an explanatory diagram illustrating a modified example of the closed lug grooves illustrated in FIG. 4.

Additionally, as illustrated in FIG. 9, by providing the extension length same as that of the short closed lug groove 41A to the middle closed lug groove 41 C in FIG. 8, the par of short closed lug grooves 41A having the same extension length may be arranged between the adjacent long closed lug grooves 41B, 41B.

Effects

As described above, the pneumatic tire 10 includes the circumferential main groove 23, the circumferential narrow groove 24, and the shoulder land portion 35 and the second land portion 34. The circumferential main groove 23 is disposed in one region (the region outer side in the vehicle width direction in FIG. 2) demarcated by the tire equatorial plane CL. The circumferential narrow groove 24 is disposed outer side of the circumferential main groove 23 in the tire width direction. The shoulder land portion 35 and the second land portion 34 are defined by the circumferential main groove 23 and the circumferential narrow groove 24 (see FIG. 2). Additionally, the pneumatic tire 10 includes the plurality of closed lug grooves 41 (41A, 41B). The plurality of closed lug grooves 41 (41A, 41B) extend in the tire width direction and penetrates the circumferential narrow groove 24. The plurality of closed lug grooves 41 (41A, 41B) have the inner terminating end portions in the tire width direction inside the second land portion 34. The plurality of closed lug grooves 41 (41A, 41B) have the outer terminating end portions inside the shoulder land portion 35 (see FIG. 3). The extension length L1_min in the tire width direction of the shortest first closed lug groove 41A and the extension length L1_max in the tire width direction of the longest second closed lug groove 41B have the relationship 1.10≤L1_max/L1_min≤3.00.

In such a configuration, (1) the closed lug grooves 41 penetrating the circumferential narrow groove 24 improve drainage properties in the vicinity of the circumferential narrow groove 24 to improve the wet performance of the tire. At the same time, since the closed lug grooves 41 do not open to the circumferential main groove 23 or the tire ground contact edge T, the rigidity of the left and right land portions 34, 35 defined by the circumferential narrow groove 24 is ensured. These have an advantage that the wet performance and dry performance of the tire are efficiently provided in a compatible manner. Additionally, (2) since the plurality of types of the closed lug grooves 41 (41A, 41B) having the mutually different extension lengths are arranged at the predetermined interval in the tire circumferential direction, naturally, the terminating end portions of the closed lug grooves 41A, 41B in at least one land portion (the second land portion 34 in FIG. 3) are arranged in the tire circumferential direction while mutually offsetting in the tire width direction. Therefore, compared to a configuration in which the left and right terminating end portions of the closed lug grooves are disposed with the positions in the tire width direction aligned (not illustrated), the long lug groove portions (the parts on the second land portion 34 side of the second closed lug grooves 41B in FIG. 3) are disposed on the road contact surface of one land portion (the second land portion 34 in FIG. 3), and the wide ground contact regions are formed between the adjacent long lug grooves at the same time. This has an advantage that the wet performance and the dry performance of the tire are efficiently improved.

Additionally, in the pneumatic tire 10, the minimum value Di_min and the maximum value Di_max (see FIG. 4) of the distance Di from the circumferential narrow groove 24 to the inner terminating end portions of the closed lug grooves 41 (41A, 41B) have the relationship 1.10≤Di_max/Di_min≤3.00. As a result, the positions of the inner terminating end portions of the closed lug grooves 41A, 41B in the second land portion 34 are made appropriate, and this has an advantage that the wet performance and the dry performance of the tire are provided in a compatible manner.

Additionally, in the pneumatic tire 10, the offset amount ΔDi in the tire width direction of the inner terminating end portions of the closed lug grooves 41 (41A, 41B) has the relationship 0.20≤ΔDi/W1≤0.40 to the ground contact width W1 (see FIG. 3) of the second land portion 34. As a result, there is an advantage that the plurality of types of the closed lug grooves 41A, 41B having the different extension lengths L1_min and L1_max can be appropriately disposed. In particular, since the second land portion 34 has the large contribution to the wet performance, there is an advantage that arranging the terminating end portions of the closed lug grooves 41A, 41B so as to be offset in the tire width direction in the second land portion 34 effectively improves the wet performance of the tire.

Additionally, in the pneumatic tire 10, the minimum value Do_min and the maximum value Do_max of the distance Do from the circumferential narrow groove 24 to the outer terminating end portions of the closed lug grooves 41 (41A, 41B) have the relationship 0.90≤Do_max/Do_min≤1.10. As a result, there is an advantage that the rigidity of the shoulder land portion 35 is ensured and the dry braking performance of the tire is improved.

Additionally, in the pneumatic tire 10, the distance Di from the circumferential narrow groove 24 to the inner terminating end portions of the closed lug grooves 41 (including the minimum value Di_min and the maximum value Di_max of the distance Di in FIG. 4) and the ground contact width W1 (see FIG. 3) of the second land portion 34 have the relationship 0.20≤Di/W1≤0.40. As a result, there is an advantage that the extension lengths Di of the closed lug grooves 41 in the tire width direction in the second land portion 34 are made appropriate. In other words, the lower limit ensures the extension length Di of the closed lug grooves 41 in the second land portion 34 and ensures the effect of improving the wet performance by the closed lug grooves 41. Additionally, the upper limit suppresses deterioration of the rigidity of the second land portion 34 caused by the excessive extension length Di of the closed lug grooves 41.

Additionally, in the pneumatic tire 10, the distance Do (including the minimum value Do_min and the maximum value Do_max of the distance Do in FIG. 4) from the circumferential narrow groove 24 to the outer terminating end portions of the closed lug grooves 41 and the ground contact width W2 (see FIG. 3) of the shoulder land portion 35 have the relationship 0.20≤Do/W2≤0.40. As a result, there is an advantage that the extension length of the closed lug grooves 41 in the tire width direction in the shoulder land portion 35 is made appropriate. In other words, the lower limit ensures the extension length Do of the closed lug grooves 41 in the shoulder land portion 35 and ensures the effect of improving the wet performance by the closed lug grooves 41. Additionally, the upper limit suppresses deterioration of the rigidity of the shoulder land portion 35 caused by the excessive extension length Do of the closed lug grooves 41.

Additionally, in this pneumatic tire 10, the inclination angle θ of the closed lug groove 41 with respect to the tire circumferential direction is in the range 55 degrees≤θ≤75 degrees (see FIG. 4). As a result, there is an advantage that the drainage properties of the closed lug grooves 41 are improved, and there is an advantage that the pattern noise of the tire caused by the closed lug grooves 41 is reduced.

Additionally, in this pneumatic tire 10, the groove width Wg of the closed lug groove 41 and the groove width Ws of the circumferential narrow groove 24 have the relationship 0.60≤Wg/Ws≤1.00. As a result, there is an advantage that the drainage action of the closed lug grooves 41 is properly ensured.

Additionally, in the pneumatic tire 10, the groove width Wg_min of the narrowest closed lug groove 41 and the groove width Wg_max (not illustrated) of the widest closed lug groove 41 have the relationship 0.90≤Wg_ max/Wg_min≤1.10. As a result, the rigidity of the land portion can be properly ensured, so there is an advantage that uneven wear is suppressed.

Additionally, in the pneumatic tire 10, the pair of the closed lug grooves 41A, 41B having the mutually different lengths are arranged in alternation in the tire circumferential direction (see FIG. 2). This has an advantage that the wet performance and dry performance of the tire are efficiently provided in a compatible manner.

Additionally, in the pneumatic tire 10, the shoulder land portion 35 includes the shoulder lug grooves 42. The shoulder lug groove 42 has one terminating end portion inside the shoulder land portion 35, extends in the tire width direction, and opens to the tire ground contact edge T (see FIG. 2). Additionally, the closed lug groove 41 (the long closed lug groove 41B in FIG. 2) is on the extension line of the groove center line of the shoulder lug groove 42. This has an advantage that the drainage properties of the shoulder land portion 35 are improved.

Additionally, in the pneumatic tire 10, the shoulder land portion 35 includes the shoulder lug grooves 42. The shoulder lug groove 42 has one terminating end portion inside the shoulder land portion 35, extends in the tire width direction, and opens to the tire ground contact edge T (see FIG. 2). Additionally, the groove center lines of the closed lug grooves 41 do not overlap with the groove center lines of the shoulder lug grooves 42 in the tire circumferential direction. As a result, there is an advantage that the pattern noise caused by the overlap of the lug grooves is reduced, and quietness of the tire is improved.

Additionally, in the pneumatic tire 10, the distance D2 from the terminating end portion of the shoulder lug groove 42 to the outer terminating end portion of the closed lug groove 41 opposed to the shoulder lug groove 42 in the tire width direction and the ground contact width W2 of the shoulder land portion 35 have the relationship 0.30≤D2/W2≤0.50 (see FIG. 3). This has an advantage that the wet performance and the dry performance of the tire are provided in a compatible manner. That is, the lower limit ensures the rigidity and the ground contact region of the shoulder land portion 35 and ensures the dry performance of the tire. Also, the upper limit ensures the extension lengths of the closed lug grooves 41 and the shoulder lug grooves 42 in the tire width direction and ensures the wet performance of the tire.

Additionally, in the pneumatic tire 10, the arrangement interval P1 of the closed lug grooves 41 and the arrangement interval P2 of the shoulder lug grooves 42 in the tire circumferential direction have the relationship 0.30≤P1/P2≤0.70. This has an advantage that the arrangement intervals P1, P2 of the closed lug grooves 41 and the shoulder lug grooves 42 are made appropriate.

Additionally, the pneumatic tire 10 includes the mounting direction indicator portion (not illustrated) specifying that the pneumatic tire 10 is to be mounted on the vehicle with the one region (the region outer side in the vehicle width direction in FIG. 2) set to the outer side in the vehicle width direction. This has the advantage that the wet performance and the dry performance of the tire can be provided in a compatible manner.

Example

Figure 11:
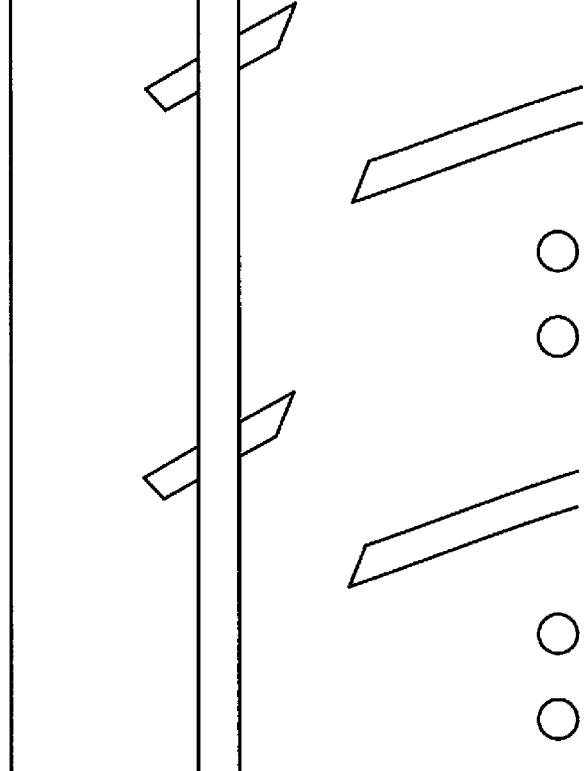
FIG. 11 is an explanatory diagram illustrating a test tire of Conventional Example shown in FIG. 10.
Figure 12:
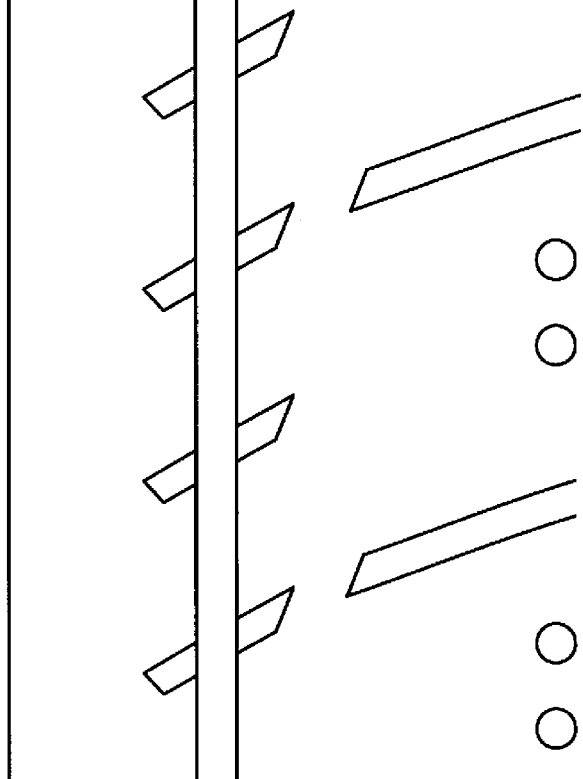
FIG. 12 is an explanatory diagram illustrating a test tire of Comparative Example shown in FIG. 10.

FIG. 10 is a table showing results of performance tests of the pneumatic tires according to the embodiments of the technology. FIG. 11 is an explanatory diagram illustrating a test tire of Conventional Example shown in FIG. 10. FIG. 12 is an explanatory diagram illustrating a test tire of Comparative Example shown in FIG. 10.

In the performance tests, a plurality of types of pneumatic tires were evaluated for (1) wet steering stability performance, (2) dry steering stability performance, and (3) noise performance. The test tires having a tire size of 245/40R18 97Y are mounted on rims having a rim size of 18×8.5 J, and an internal pressure of 230 kPa and a load specified by JATMA are applied to the test tires. The test tires are mounted on all wheels of the vehicle as the test vehicle.

(1) In the evaluation for wet steering stability performance, the test vehicle is driven on a predetermined test course under rainy conditions, and the lap time is measured. The index evaluation is performed based on the measurement results. Results of the evaluation are expressed as index values and evaluated with the Conventional Example being assigned as the reference (100). In this evaluation, larger values are preferable.

(2) In the evaluation for dry steering stability performance, the test vehicle runs on a test course of dry road surfaces including a flat circuit at from 60 km/h to 100 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

(3) In the evaluation for noise performance, the test vehicle coasts on a test course having a rough road surface at 10 km/h to 20 km/h, and a test driver performs sensory evaluation on cabin noise. Results of the evaluation are expressed as index values and evaluated with the Conventional Example being assigned as the reference (100). In this evaluation, larger values are preferable.

The test tires of Examples 1 to 11 have the configuration illustrated in FIG. 1 to FIG. 3, and includes the circumferential main groove 23 and the circumferential narrow groove 24, the two types of long and short closed lug grooves 41A, 41B, and the shoulder lug grooves 42 in the region outer side in the vehicle width direction. Additionally, in FIG. 2, the tread width TW is 200 mm, the distance Dm of the circumferential main groove 23 is 25.0 mm, and the distance Dn of the circumferential narrow groove 24 is 60.0 mm. Additionally, in FIG. 3, the groove width Wm of the circumferential main groove 23 is 15.0 mm, the groove width Ws of the circumferential narrow groove 24 is 5.0 mm, the width W1 of the second land portion 34 was 27.0 mm, and the width W2 of the shoulder land portion 35 is 36.0 mm. Also, the arrangement interval P1 of the closed lug grooves 41 and the arrangement interval P2 of the shoulder lug grooves 42 have the relationship P1/P2=0.50. Additionally, a pair of the short and long closed lug grooves 41A, 41B and one shoulder lug groove 42 are disposed in each unit pitch.

As illustrated in FIG. 11, the test tire of Conventional Example does not include the long closed lug grooves 41B as in the test tire of Example 1. Furthermore, the short closed lug grooves are located out of the extension lines of the groove center lines of the shoulder lug grooves. As illustrated in FIG. 12, in the test tire of Comparative Example, the extension lengths of the closed lug grooves 41A, 41B in the test tire of Example 1 are set to be constant.

As shown by the test results, it is seen that the test tires of Examples 1 to 11 improve the wet steering stability performance, the dry steering stability performance, and the noise performance of the tire.

The invention claimed is:

1. A pneumatic tire, comprising:
a circumferential main groove disposed in one region demarcated by a tire equatorial plane;
a circumferential narrow groove disposed outward of the circumferential main groove in a tire width direction and having a groove width narrower than a groove width of the circumferential main groove, the groove width being a maximum distance between left and right groove walls at a groove opening portion and being measured when the tire is mounted on a specified rim, inflated to specified internal pressure, and in an unloaded state;
a shoulder land portion and a second land portion defined by the circumferential main groove and the circumferential narrow groove;
a plurality of closed lug grooves extending in the tire width direction and penetrating the circumferential narrow groove, the plurality of closed lug grooves having inner terminating end portions in the tire width direction inside the second land portion, the plurality of closed lug grooves having outer terminating end portions inside the shoulder land portion, the plurality of closed lug grooves being lateral grooves extending in the tire width direction and configured to open when the tire comes into contact with a ground to function as grooves; and
an extension length L1_min in the tire width direction of a shortest first closed lug groove and an extension length L1_max in the tire width direction of a longest second closed lug groove having a relationship $1.10 \leq L1\_max/L1\_min \leq 3.00$; wherein
a minimum value Di_min and a maximum value Di_max of a distance Di from the circumferential narrow groove to the inner terminating end portions of the closed lug grooves have a relationship $1.10 \leq Di\_max/Di\_min \leq 3.00$, and
a minimum value Do_min and a maximum value Do_max of a distance Do from the circumferential narrow groove to the outer terminating end portions of the closed lug grooves have a relationship $0.90 \leq Do\_max/Do\_min \leq 1.10$.

2. The pneumatic tire according to claim 1, wherein an offset amount ΔDi in the tire width direction of the inner terminating end portions of the closed lug grooves has a relationship $0.10 \leq \Delta Di/W1 \leq 0.60$ to a ground contact width W1 of the second land portion.

3. The pneumatic tire according to claim 1, wherein a distance Di from the circumferential narrow groove to the inner terminating end portions of the closed lug grooves and a ground contact width W1 of the second land portion have a relationship $0.10 \leq Di/W1 \leq 0.80$.

4. The pneumatic tire according to claim 1, wherein a distance Do from the circumferential narrow groove to the outer terminating end portions of the closed lug grooves and a ground contact width W2 of the shoulder land portion have a relationship $0.10 \leq Do/W2 \leq 0.60$.

5. The pneumatic tire according to claim 1, wherein the closed lug groove have an inclination angle θ with respect to a tire circumferential direction in a range 50 degrees $\leq \theta \leq 80$ degrees.

6. The pneumatic tire according to claim 1, wherein a groove width Wg of the closed lug grooves and the groove width Ws of the circumferential narrow groove have a relationship $0.30 \leq Wg/Ws \leq 1.30$.

7. The pneumatic tire according to claim 1, wherein a groove width Wg_min of a narrowest closed lug groove and a groove width Wg_max of a widest closed lug groove have a relationship $0.90 \leq Wg\_max/Wg\_min \leq 1.10$.

8. The pneumatic tire according to claim 1, wherein a pair of the closed lug grooves having mutually different lengths are arranged in alternation in a tire circumferential direction.

9. The pneumatic tire according to claim 1, wherein
the shoulder land portion includes shoulder lug grooves, the shoulder lug grooves having terminating end portions inside the shoulder land portion, extending in the tire width direction, and opening to a tire ground contact edge, and
the closed lug grooves are on extension lines of groove center lines of the shoulder lug grooves.

10. The pneumatic tire according to claim 1, wherein
the shoulder land portion includes shoulder lug grooves, the shoulder lug grooves having terminating end portions inside the shoulder land portion, extending in the tire width direction, and opening to a tire ground contact edge, and
the closed lug grooves have groove center lines that do not overlap with groove center lines of the shoulder lug grooves in a tire circumferential direction.

11. The pneumatic tire according to claim 9, wherein a distance D2 from the terminating end portion of the shoulder lug groove to the outer terminating end portion of the closed lug groove opposed to the shoulder lug groove in the tire width direction and a ground contact width W2 of the shoulder land portion have a relationship $0.10 \leq D2/W2 \leq 0.60$.

12. The pneumatic tire according to claim 9, wherein an arrangement interval P1 of the closed lug grooves and an arrangement interval P2 of the shoulder lug grooves in a tire circumferential direction have a relationship $0.30 \leq P1/P2 \leq 0.70$.

13. The pneumatic tire according to claim 1, comprising:
a mounting direction indicator portion specifying that the pneumatic tire is to be mounted on a vehicle with the one region set to an outer side in a vehicle width direction.

14. The pneumatic tire according to claim 10, wherein a distance D2 from the terminating end portion of the shoulder lug groove to the outer terminating end portion of the closed lug groove opposed to the shoulder lug groove in the tire width direction and a ground contact width W2 of the shoulder land portion have a relationship $0.10 \leq D2/W2 \leq 0.60$.

15. The pneumatic tire according to claim 10, wherein an arrangement interval P1 of the closed lug grooves and an arrangement interval P2 of the shoulder lug grooves in a tire circumferential direction have a relationship $0.30 \leq P1/P2 \leq 0.70$.

16. The pneumatic tire according to claim 1, wherein the circumferential narrow groove has a groove width of from 3 mm to 7 mm.

17. A pneumatic tire, comprising:
a circumferential main groove disposed in one region demarcated by a tire equatorial plane;
a circumferential narrow groove disposed outward of the circumferential main groove in a tire width direction;
a shoulder land portion and a second land portion defined by the circumferential main groove and the circumferential narrow groove;
a plurality of closed lug grooves extending in the tire width direction and penetrating the circumferential narrow groove, the plurality of closed lug grooves having inner terminating end portions in the tire width direction inside the second land portion, the plurality of closed lug grooves having outer terminating end portions inside the shoulder land portion; and an extension length L1_min in the tire width direction of a shortest first closed lug groove and an extension length L1_max in the tire width direction of a longest second closed lug groove having a relationship $1.10 \leq L1\_max/L1\_min \leq 3.00$; wherein the shoulder land portion includes shoulder lug grooves, the shoulder lug grooves having terminating end portions inside the shoulder land portion, extending in the tire width direction, and opening to a tire ground contact edge, the closed lug grooves are on extension lines of groove center lines of the shoulder lug grooves, and an arrangement interval P1 of the closed lug grooves and an arrangement interval P2 of the shoulder lug grooves in a tire circumferential direction have a relationship $0.30 \leq P1/P2 \leq 0.70$.

18. A pneumatic tire, comprising:

a circumferential main groove disposed in one region demarcated by a tire equatorial plane;

a circumferential narrow groove disposed outward of the circumferential main groove in a tire width direction;

a shoulder land portion and a second land portion defined by the circumferential main groove and the circumferential narrow groove;

a plurality of closed lug grooves extending in the tire width direction and penetrating the circumferential narrow groove, the plurality of closed lug grooves having inner terminating end portions in the tire width direction inside the second land portion, the plurality of closed lug grooves having outer terminating end portions inside the shoulder land portion; and an extension length L1_min in the tire width direction of a shortest first closed lug groove and an extension length L1_max in the tire width direction of a longest second closed lug groove having a relationship $1.10 \leq L1\_max/L1\_min \leq 3.00$; wherein the shoulder land portion includes shoulder lug grooves, the shoulder lug grooves having terminating end portions inside the shoulder land portion, extending in the tire width direction, and opening to a tire ground contact edge, the closed lug grooves have groove center lines that do not overlap with groove center lines of the shoulder lug grooves in a tire circumferential direction, and an arrangement interval P1 of the closed lug grooves and an arrangement interval P2 of the shoulder lug grooves in a tire circumferential direction have a relationship $0.30 \leq P1/P2 \leq 0.70$.

19. A pneumatic tire, comprising:

a circumferential main groove disposed in one region demarcated by a tire equatorial plane;

a circumferential narrow groove disposed outward of the circumferential main groove in a tire width direction and having a groove width narrower than a groove width of the circumferential main groove, the groove width being a maximum distance between left and right groove walls at a groove opening portion and being measured when the tire is mounted on a specified rim, inflated to specified internal pressure, and in an unloaded state;

a shoulder land portion and a second land portion defined by the circumferential main groove and the circumferential narrow groove;

a plurality of closed lug grooves extending in the tire width direction and penetrating the circumferential narrow groove, the plurality of closed lug grooves having inner terminating end portions in the tire width direction inside the second land portion, the plurality of closed lug grooves having outer terminating end portions inside the shoulder land portion, the plurality of closed lug grooves being lateral grooves extending in the tire width direction and configured to open when the tire comes into contact with a ground to function as grooves; and an extension length L1_min in the tire width direction of a shortest first closed lug groove and an extension length L1_max in the tire width direction of a longest second closed lug groove having a relationship $1.10 \leq L1\_max/L1\_min \leq 3.00$; wherein the inner terminating end portions of the closed lug grooves are arranged with positions in the tire width direction aligned in the second land portion, and the outer terminating end portions of the closed lug grooves are arranged offset in the tire width direction in the shoulder land portion.

20. The pneumatic tire according to claim 19, wherein an offset amount $\Delta Di$ of the inner terminating end portions of the closed lug grooves has a relationship $0 \leq \Delta Di/W1 \leq 0.05$ to a ground contact width W1 of the second land portion.

21. The pneumatic tire according to claim 19, wherein an offset amount $\Delta Do$ of the outer terminating end portions of the closed lug grooves has a relationship $0.10 \leq \Delta Do/W2 \leq 0.60$ to a ground contact width W2 of the shoulder land portion.

22. A pneumatic tire, comprising:

a circumferential main groove disposed in one region demarcated by a tire equatorial plane;

a circumferential narrow groove disposed outward of the circumferential main groove in a tire width direction and having a groove width narrower than a groove width of the circumferential main groove, the groove width being a maximum distance between left and right groove walls at a groove opening portion and being measured when the tire is mounted on a specified rim, inflated to specified internal pressure, and in an unloaded state;

a shoulder land portion and a second land portion defined by the circumferential main groove and the circumferential narrow groove;

a plurality of closed lug grooves extending in the tire width direction and penetrating the circumferential narrow groove, the plurality of closed lug grooves having inner terminating end portions in the tire width direction inside the second land portion, the plurality of closed lug grooves having outer terminating end portions inside the shoulder land portion, the plurality of closed lug grooves being lateral grooves extending in the tire width direction and configured to open when the tire comes into contact with a ground to function as grooves; and an extension length L1_min in the tire width direction of a shortest first closed lug groove and an extension length L1_max in the tire width direction of a longest second closed lug groove having a relationship $1.10 \leq L1\_max/L1\_min \leq 3.00$; wherein the plurality of closed lug grooves are each disposed with longitudinal directions of the outer terminating end portions inside the shoulder land portion inclined in a same direction as the inner terminating end portions inside the second land portion with respect to a tire circumferential direction.

23. The pneumatic tire according to claim 22, wherein the closed lug grooves have an inclination angle θ with respect to the tire circumferential direction in a range of 50 degrees≤θ≤80 degrees.

\* \* \* \* \*